United States Patent
Yamaguchi et al.

(10) Patent No.: US 7,221,633 B2
(45) Date of Patent: May 22, 2007

(54) DISK DATA REPRODUCTION DEVICE USING NRZI MODULATED DATA

(75) Inventors: Shigeo Yamaguchi, Kanagawa (JP); Masayoshi Nagata, Kanagawa (JP)

(73) Assignee: Sony Corporation, Tokyo (JP)

( * ) Notice: Subject to any disclaimer, the term of this patent is extended or adjusted under 35 U.S.C. 154(b) by 514 days.

(21) Appl. No.: 10/294,252

(22) Filed: Nov. 14, 2002

(65) Prior Publication Data
US 2003/0123363 A1 Jul. 3, 2003

(30) Foreign Application Priority Data
Nov. 15, 2001 (JP) ............................. 2001-349794

(51) Int. Cl.
*G11B 7/0045* (2006.01)
(52) U.S. Cl. .................................................. 369/53.22
(58) Field of Classification Search .................... None
See application file for complete search history.

(56) References Cited

U.S. PATENT DOCUMENTS 5,229,986 A * 7/1993 Mizokami et al. ....... 369/59.24

* cited by examiner

*Primary Examiner*—William Korzuch
*Assistant Examiner*—Joseph Haley
(74) *Attorney, Agent, or Firm*—Oblon, Spivak, McClelland, Maier & Neustadt, P.C.

(57) ABSTRACT

The present invention relates to an optical disk device and can be applied to, for example, a reproduction system of a phase-change-type optical disk device handling high density recording in order to improve the detection accuracy of specific patterns, such as a synchronizing pattern, without increasing the redundancy of the format. A specific pattern is detected by using NRZI data D1R that is obtained by signal processing of a reproduction signal DRF, and has been NRAI-modulated from pulse-position-modulated data D2R.

3 Claims, 6 Drawing Sheets

| m[k-n-1] | m[k-n] | D2R | D1R |
|---|---|---|---|
| S00 | S00 | 0 | 0 |
| S00 | S01 | 1 | 1 |
| S01 | S11 | 0 | 1 |
| S11 | S11 | 0 | 1 |
| S11 | S10 | 1 | 0 |
| S10 | S00 | 0 | 0 |

DISK DATA REPRODUCTION DEVICE USING NRZI MODULATED DATA

BACKGROUND OF THE INVENTION

1. Field of the Invention

The present invention relates to an optical disk device and can be applied to, for example, a reproduction system of a phase-change-type optical disk device handling high density record. In the invention, a certain pattern is detected using NRZI data that is NRZI-modulated from pulse-position-modulated data obtained by signal processing of reproduction signals, thereby improving the accuracy of detecting certain patterns, such as a synchronizing pattern, without increasing the redundancy of the format.

2. Description of the Related Art

In recent years, in an optical disk device for high density recording, due to inevitable intersymbol interference in the reproduction data, data recorded in an optical disk is reproduced by PRML (Partial Response Maximum Likelihood) using a maximum likelihood decoding circuit such as a viterbi decoding circuit.

In this type of optical disk device, user data to be recorded is divided into block units of a predetermined size, has error correction symbols and the like added thereto, and then a process including interleaving is performed. Subsequently, each block has a synchronizing pattern and so on allocated thereto. Further, such generated data rows are modulated into, for example, RLL (Run Length Limited) data, and then this RLL data is NRZI (Non Return to Zero Inverted) modulated. In an optical disk device such as a phase-change-type optical disk, the light intensity of a laser beam is increased with a predetermined timing, according to the NRZI data, thereby sequentially forming a string of marks to record desired data onto an optical disk. In an optical magnetic disk device, the light intensity of a laser beam is increased with a constant period, and a modulated magnetic field is applied to the positions irradiated by the laser beam, according to NRZI data, thereby forming a string of marks to heatmagnetically record desired data.

When reproducing data, a laser beam is irradiated to an optical disk and the returning light is received, thereby generating reproducing signals having a signal level varying according to the a string of marks. In an optical disk device, this laser beam forms beam spots with a predetermined size on an optical disk to cause intersymbol interference; accordingly, reproducing signals with the intersymbol interference are detected in the presence of superimposed random noise, that is to say, Gaussian noise.

In the optical disk device, the reproducing signals are binarized in such a manner as to reproduce a clock, and then the reproducing signals are converted from analog to digital, using this clock to generate digital reproducing signals. Further, the digital reproducing signals are decoded by a viterbi decoder to obtain RLL data. This RLL data is pulse-position-modulated data in which pits and lands, or marks and spaces are represented by a logical value. In the optical disk device, with the synchronizing pattern detected by this RLL data as a reference, the RLL data is selectively taken to be RLL-decoded, and then deinterleave processing, error correction processing, and the like are performed to reproduce the user data recorded on the optical disk.

Since synchronizing patterns are used as processing references for selecting from RLL data, improved detection accuracies are desired. For this purpose, it is necessary to assign a pattern that does not occur in other parts as a synchronizing pattern to extend the length of the pattern, and to determine the reproduced RLL data, using the long pattern length.

However, using a long pattern length to improve the detection accuracy of the synchronizing pattern causes a problem in that the redundancy of the format is increased instead, which prevents the data recording surface of the optical disk from being used for recording user data effectively.

SUMMARY OF THE INVENTION

The present invention has been developed in consideration of the above described problems, and has an object the provision of an optical disk device that can improve the detection accuracy of a certain pattern such as a synchronizing pattern without increasing the redundancy of the format.

In a first aspect of the present invention to solve this problem, a disk reproducing device according to the invention is comprised of decoding means for decoding, by signal processing of a reproducing signal, NRZI data that has been NRZI-modulated from pulse-position-modulated data and raises a logical value with a timing corresponding to edges of pits or edges of marks, and pattern detecting means for detecting a certain pattern from the NRZI data.

While NRZI data, which has been NRZI-modulated from the pulse-position-modulated data, indicates, using a logical value, the timing of the edges of pits or the edges of marks formed on an optical disk, pulse-position-modulated data indicates pits and lands, or marks and spaces, using a logical value. Accordingly, with the configuration in the first aspect, the certain pattern can be detected from the NRZI data by a shorter pattern and with more reliability than in the case of detecting the certain pattern from the pulse-position-modulated data. Thus, the detection accuracy of a certain pattern such as a synchronizing pattern is improved without increasing the redundancy of the format.

DESCRIPTION OF THE PREFERRED EMBODIMENTS

Embodiments of the present invention will now be described in detail, with reference to the attached drawings.

First, the configuration of a first embodiment will be described.

Figure 1:
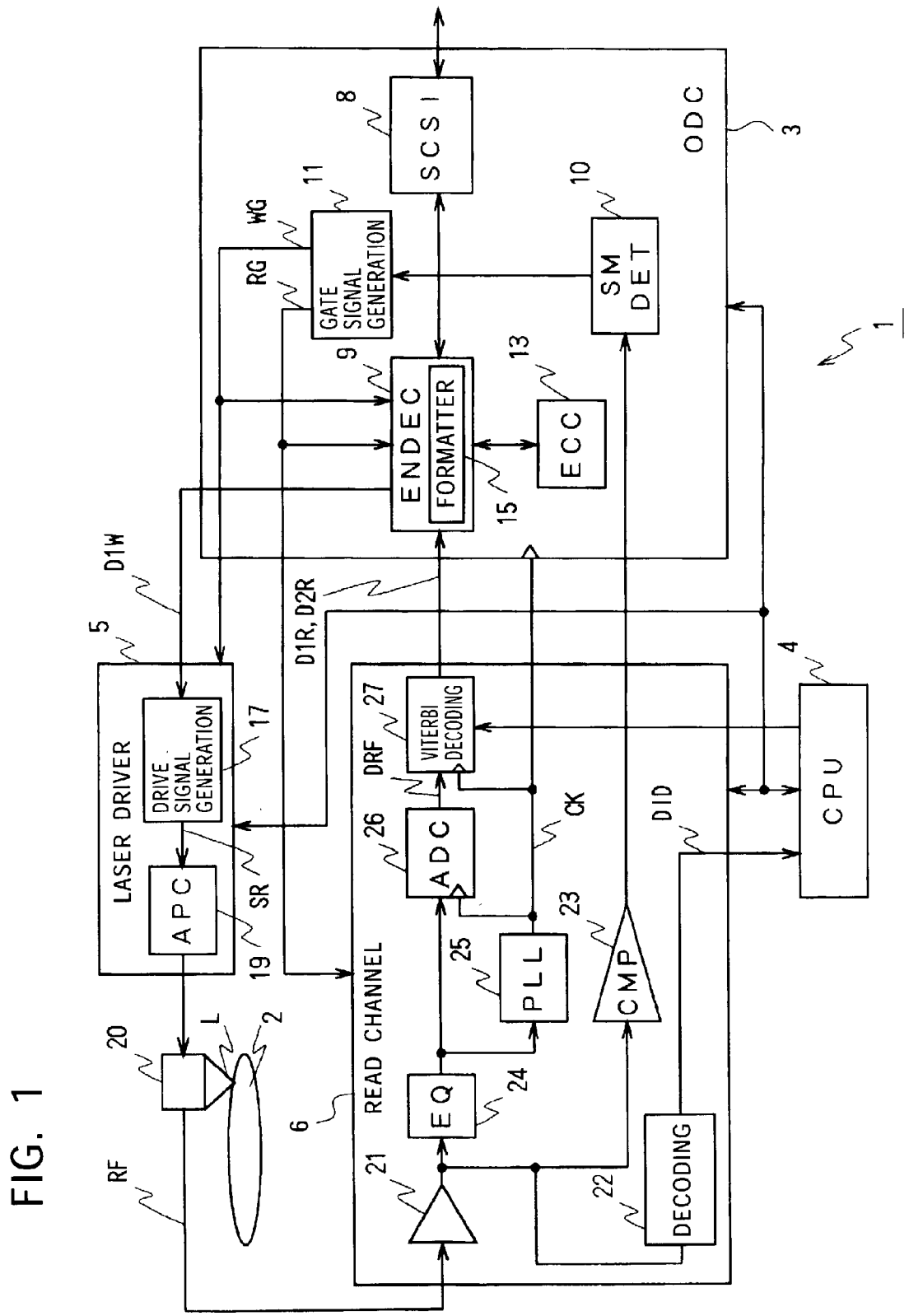
FIG. 1 is a block diagram of an optical disk device according to an embodiment of the present invention.

FIG. 1 is a block diagram of an optical disk device according to an embodiment of the present invention. The optical disk device 1 is configured as an external storage device for a host device, wherein the optical disk device 1 is connected to the host device such as a computer. Thus, the optical disk device 1 records user data output by the host device onto an optical disk 2, and reproduces the user data from the optical disk 2 to output it to the host device.

The optical disk 2 is a phase-change-type optical disk, in which certain disk identification data DID is recorded at the innermost periphery, for example, in a barcode shape. The disk identification data DID is used for detecting the type of the optical disk 2 and the like. Further, in the optical disk 2, a spiral track is formed on a data recording surface, and on the spiral track, headers in a preformat are recorded with a certain pitch to sequentially form sectors. In the optical disk device 1, user data and the like are recorded with the headers as a reference, and also, the recorded data is reproduced.

Figure 2:
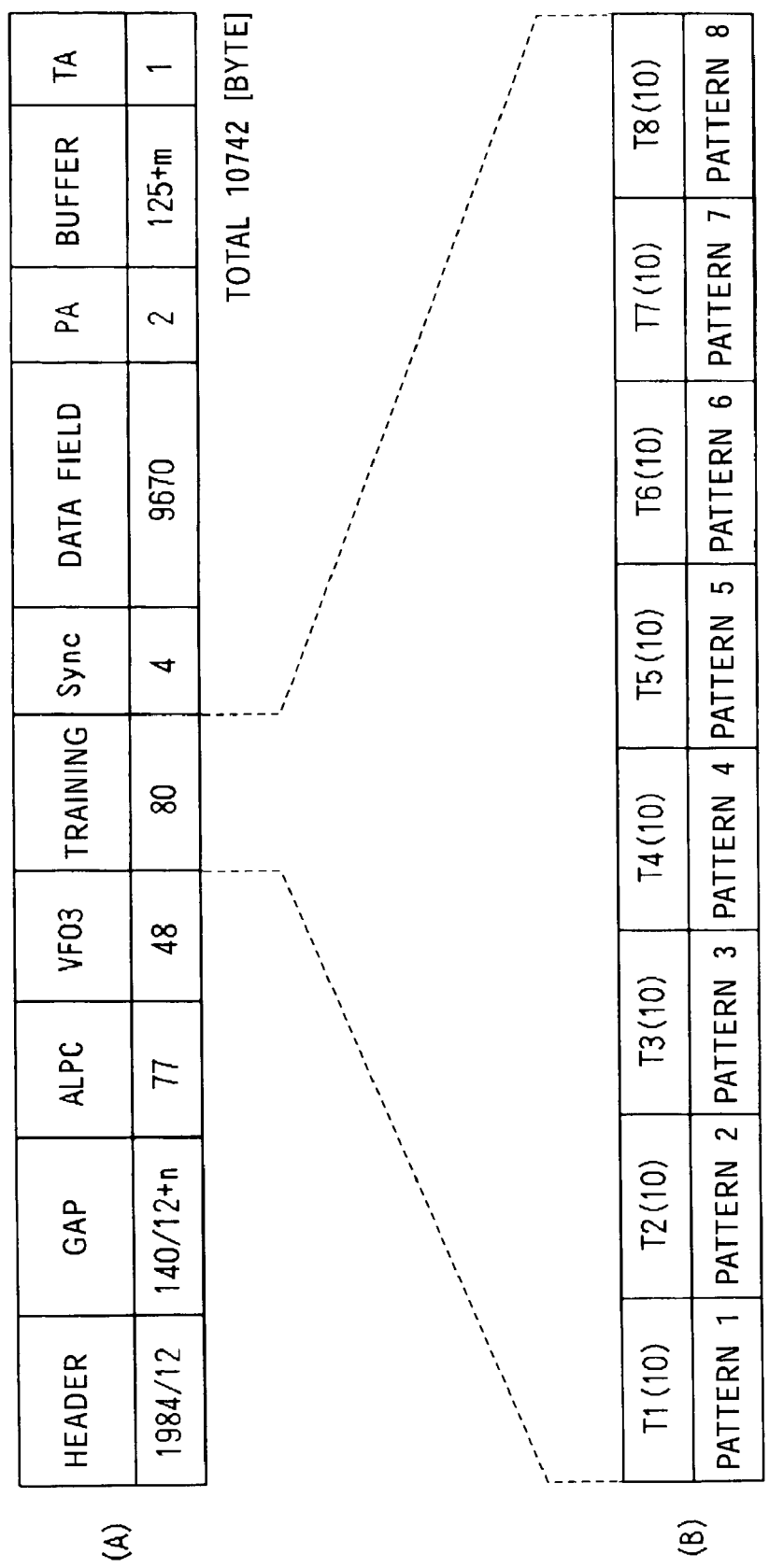
FIG. 2 shows tables showing the format used in the optical disk device in FIG. 1.

FIGS. 2A and 2B are tables showing the structure of the sectors on the optical disk 2. In table (A) of FIG. 2, the numbers in the table indicate data size. In the description below, each area in a sector will be described sequentially in the order shown in FIG. 2.

In the optical disk 2, a header is located at the head of each sector, and the header is allocated a sector mark and address information. The optical disk 2 can detect the address information of each sector with its sector mark as a reference.

Gaps are formed between each sector. The gap is a buffer zone between the header and the recording area for user data. In the optical disk 2, the operations of various circuits in the optical disk device are switched using the period corresponding to this gap in order to stabilize these circuits. ALPC is an area used to increase the light intensity of a laser beam. In VFO3, a reference signal for locking a PLL (Phase Locked Loop) circuit that generates a clock for reproduction is recorded. In the training area, a reference signal for automatic adjustment of the characteristics of an equalizer is recorded. In the optical disk device 1, the training area is configured to be used for setting the characteristics of the equalizer and detecting the following synchronizing pattern Sync.

In other words, as shown in FIG. 2B, an area of 80 bytes is allocated for the training area, and the area is sequentially divided into areas T1 to T8, each area having 10 bytes. In each of the areas T1 to T8, certain patterns (pattern 1 to pattern 4) for setting the characteristics of the equalizer are recorded. Defining T as the fundamental period at which marks and spaces are formed in the optical disk 2, in the first area T1, a first pattern 1 sequentially consisting of the follows is repeated six times: a space with a period of 3T, a mark with a period of 3T, a space with a period of 2T, a mark with a period 2T, a space with a period of 5T, and a mark with a period of 5T. In the second area T2, a second pattern 2 sequentially consisting of the follows is repeated six times: a space with a period of 3T, a mark with a period of 2T, a space with a period of 2T, a mark with a period ST, a space with a period of 5T, and a mark with a period of 3T. In the third area T3, a third pattern 3 sequentially consisting of the follows is repeated six times: a space with a period of 2T, a mark with a period of 2T, a space with a period of 3T, a mark with a period of 3T, a space with a period of 5T, and a mark with a period of 5T. In the fourth area T4, a fourth pattern 4 sequentially consisting of the follows is repeated six times: a space with a period of 2T, a mark with a period of 3T, a space with a period of 3T, a mark with a period ST, a space with a period of 5T, and a mark with a period of 2T. In the fifth to eighth areas T5 to T8, recording is done respectively the same as the first to fourth areas T1 to T4.

Next, the synchronizing pattern Sync is a reproduction reference for the following data field. In the optical disk 2, with the timing at which the synchronizing pattern Sync is detected as a reference, the reproduction result is selectively processed to reproduce the user data recorded in the following data field. In the data field, user data is recorded along with error correction symbols.

The postamble (PA) is provided to normally complete the RLL (1, 7) modulation and demodulation, which is the modulation system of user data used in the optical disk 2. The buffer is a buffer zone between the end of the data area and the head of the next sector, and is arranged to be able to absorb variations in sector length due to eccentricity of the optical disk 2 etc. The optical disk 2 is designed to permit land/groove recording, and TA (Transition Area) is an area for transition from the data area to the head of the next sector, with the land surface being used as a reference when recording grooves.

In each sector in such a format, while the areas other than the gap and buffer are formed with a length corresponding to each constant data amount, the gap and buffer are formed such that the lengths vary complementarily, thereby the optical disk 2 preventing repeated recording at the same portion and avoiding degradation of the characteristics. Such variation in the lengths is set such that the lengths randomly vary within the range of 255 channel bits. Accordingly, in the optical disk 2, even in the areas, in which same data such as VFO3, synchronizing patterns Sync are always recorded, the mark positions and space positions are randomly changed to prevent degradation of the recording and reproducing characteristics. On the other hand, however, when reproducing, the set position of the window for detecting the synchronizing pattern Sync varies, thus making it difficult to detect the synchronizing pattern Sync. As a result of this, in the optical disk device 1, by detecting the synchronizing pattern Sync with the training data as a reference, as described above, degradation of the recording and reproducing characteristics is prevented, and also the accuracy of detecting the synchronizing pattern Sync is improved.

In the optical disk device 1, an ODC (Optical Disk Controller) 3, which is a processing circuit that processes data that is input from or output to the host device, notifies a central processing unit (CPU) 4 of commands obtained from the host device and also notifies the host device of responses to this notification from the central processing unit 4. Further, according to an instruction to change operation obtained by such a command notification, the ODC 3 processes user data sequentially input from the host device to generate NRZI data D1W, and thereby drives a laser driver 5 to record the user data onto the optical disk 2. Also conversely, by processing NRZI data D1R or pulse-position-modulated data D2R, which are output from a read channel 6, the ODC 3 reproduces the user data and outputs this user data to the host device.

In the ODC 3, a SCSI (Small Computer System Interface) 8 is the interface with the host device. The ODC 3 notifies the central processing unit 4 of a command obtained from the host device, and also notifies the host device of the response to this notification from the central processing unit 4. Further, the ODC 3 outputs, to an encoder/decoder (ENDEC) 9, user data sequentially input from the host device, and in addition, outputs user data obtained from the encoder/decoder 9 to the host device.

A sector mark detection circuit (SMDET) 10 receives the binary signal of a reproducing signal from the read channel 6, and processes this binary signal to detect a sector mark. The sector mark detection circuit 10 asserts an embedded ID read gate by detecting this sector mark to obtain following address information. Further, by comparing the address information instructed by the central processing unit 4 and such obtained address information, the ODC 3 determines whether the sector whose sector mark has been detected is the sector instructed by the central processing unit 4 or not, and notifies the central processing unit 4 of the result of the determination. Still further, the ODC 3 notifies a gate signal generation circuit 11 of the timing of the sector mark detection and the result of the determination on the address information as well.

With the timing, which is notified as described above, of sector mark detection as a reference, the gate signal generation circuit 11 generates various reference signals, according to the results of determination on address information. In other words, in the case that writing is instructed by the central processing unit 4, when detection of a sector is notified by the sector mark detection circuit 10, the gate signal generation circuit 11 asserts a write gate signal WG during the period at which the laser beam scans the area from ALPS to the postamble in the format described above with reference to FIG. 2, and thus, data in the format in FIG. 2 is recorded onto the optical disk 2 during this period. Also, in the case that reading is instructed by the central processing unit 4, when detection of a sector is notified by the sector mark detection circuit 10, during the period at which the laser beam scans the area from the gap to the buffer, the gate signal generation circuit 11 asserts a read gate signal RG, and thereby during this time, the read channel 6 processes a reproducing signal, which is in the format in FIG. 2 and obtained from the optical disk 2, to reproduce the user data recorded on the optical disk 2.

An error correction circuit (ECC) 13, when writing, sequentially generates error correction symbols to output user data to the encoder/decoder 9, and when reading, performs the process of error correction of the user data reproduced by the encoder/decoder 9.

When writing, the encoder/decoder 9 divides user data input by SCSI 8 into block units of a predetermined size, adds error correction symbols generated by the error correction circuit, and then performs the process of interleaving, thereby generating data to be recorded into the data field. The encoder/decoder 9 RLL (1-7)-modulates the data, which is such generated and to be recorded into the data field, to generate RLL data, and then a formatter 15 adds, to this RLL data, ALPC, VFO3, data corresponding to the training data, a synchronizing pattern Sync, and the like. Accordingly, the formatter 15 generates a string of data for recording in a format described above with reference to FIG. 2. Through these steps, the encoder/decoder 9 generates a string of data, for recording, from RLL data, which is pulse-position-modulation data, and then NRZI-modulates this string of data to generate NRZI data D1W.

In the case that the optical disk 2 mounted to the optical disk device 1 has a conventional format, the encoder/decoder 9 similarly generates NRZI data D1W in a corresponding format, according to an instruction by the central processing unit 4. Thus, the optical disk device 1 is configured to make it possible to record user data on optical disks with various formats.

If a write gate signal WG is asserted, the encoder/decoder 9 sequentially outputs such generated NRZI data D1W, synchronizing with a write clock that is the reference signal when writing.

On the other hand, when reproducing, if a read gate signal RG is asserted, the encoder/decoder 9 selectively inputs output data D1R or D2R from the read channel 6, and detects a synchronizing pattern from the output data D1R or D2R. Further, with the result of detection of this synchronizing pattern as a reference, the encoder/decoder 9 selectively processes the output data D1R or D2R, to reproduce and output the user data.

In other words, if processing of the optical disk 2 in the format described above with reference to FIG. 2 is instructed by the central processing unit 4, the encoder/decoder 9 inputs NRZI data D1R output from the read channel 6 by asserting a read gate signal RG. The formatter 15 searches a complete coincidence between sequential 40 channel bits of thus input NRZI data D1R and a string of bits that is the reference for determination, and thus detects each boundary between the areas, T1 to T8, described above with reference to FIG. 2. Further, with such detected timings of boundaries as a reference, the formatter 15 sets a window for detecting the synchronizing pattern Sync, and masks the NRZI data D1R with this window. Still further, the formatter 15 searches a complete coincidence between the result of this mask and a predetermined reference pattern to detect the synchronizing pattern Sync.

The encoder/decoder 9 selectively obtains the NRZI data D1R with the timing of detection of the synchronizing pattern Sync by the formatter 15 as a reference, and thereby takes in data from the data field to decode the data into RLL data. After RLL-decoding this RLL data, the encoder/decoder 9 performs deinterleaving, and error correction by the error correction circuit 13. Thus, the encoder/decoder 9 reproduces the user data to output it to SCSI 8.

On the other hand, if processing of an optical disk with a conventional format that is different from the optical disk 2 with the format described above with reference to FIG. 2 is instructed by the central processing unit 4, the encoder/decoder 9 inputs RLL data D2R output from the read channel 6 by asserting a read gate signal RG. The formatter 15 searches a complete coincidence between a predetermined number of sequential channel bits of such input RLL data D2R and a string of bits that is the reference for determination, thereby detecting the synchronizing pattern. The encoder/decider 9, with the timing of detecting the synchronizing pattern with the formatter 15 as a reference, selectively obtains the RLL data D2R to take in data from the data field, and then RLL-decodes this data, performs deinterleaving, and performs error correction by the error correction circuit 13. Accordingly, the encoder/decoder 9 reproduces the user data to output it to SCSI8.

The laser driver 5, when writing, according to NRZI data D1W that is output from the ODC 3 by asserting the write gate signal WG, increases the light intensity of the laser beam to be irradiated at the optical disk 2, and when reading, maintains the light intensity of the laser beam at a predetermined light intensity.

Figure 3A:
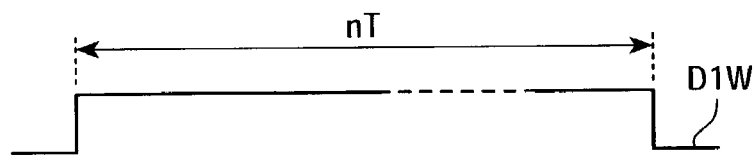
FIGS. 3A and 3B are signal waveform diagrams for explaining the writing of data into the optical disk device.
Figure 3B:
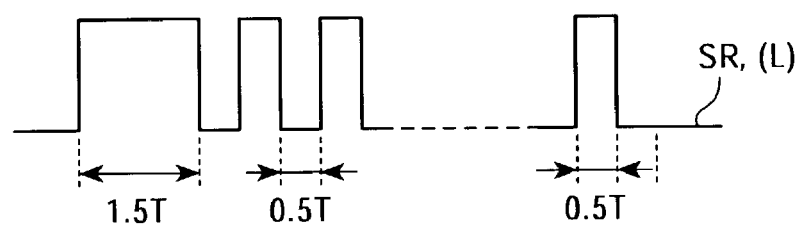

In other words, in the laser driver 5, as shown in FIGS. 3A and 3B, during the period while NZRI data D1W is in on-state with a fundamental period of T, a drive signal generation circuit 17 raises the signal level with a period of 1.5T, and then drops the signal level with a period of 0.5T, and repeatedly raises and drops the signal level, thereby generates a drive signal SR, corresponding to the NRZI data D1W.

With the result of monitoring the light intensity of a laser beam L output from a light pickup 20 as a reference, an automatic power control circuit (APC) 19, when writing, drives a semiconductor laser of the light pickup 20 in order to increase the light intensity of the laser beam L, from the light intensity for reproducing to the light intensity for writing, according to this drive signal SR. Thus, the laser driver 5 sequentially forms a string of marks by the so-called pulse train system on the optical disk 2 to record desired user data. On the other hand, when reading, the automatic power control circuit 19 drives the semiconductor laser of the light pickup 20 to emit a laser beam in a predetermined light intensity.

The optical pickup 20 is supported by a certain drive mechanism and configured so as to be movable in the radius direction of the optical disk 2. An embedded semiconductor laser emits a laser beam to irradiate the optical disk 2 that rotates with a predetermined rotational speed by a spindle motor, not shown. The optical pickup 20 also receives a returning light, created by this irradiation of the laser beam, obtained from the optical disk 2 by a certain light-receiving element. By processing the result of this light receiving by the light receiving element, a reproducing signal RF that changes its signal level, according to a string of bits and a string of marks, a tracking error signal that changes its signal level, according to a tracking error amount, a focus error signal that changes its signal level, according to a focus error amount, and so on, are generated. The optical pickup 20 is configured such that an object lens is movable by a servo circuit, not shown, according to the tracking error signal and focus error signal, thereby enabling tracking control and focus control. In this embodiment, the optical pickup 20 emits a laser beam having a wavelength of 405 [nm] by an object lens having a numerical aperture of 0.85.

The read channel 6 signal-processes a reproducing signal RF obtained by the optical pickup 2, with a read gate signal RG as a reference, and thus decodes NRZI data D1R, RLL data D2R, or the like, to output them.

In the read channel 6, an amplification circuit 21 amplifies a reproducing signal RF by a predetermined gain to output it. During the period while the laser beam scans the recording area of identification data DID on the inner periphery side of the optical disk 2, a decoding circuit 22 binarizes, by a predetermined threshold, the reproducing signal RF, which is output by this amplification circuit 21, to decode it, and thereby reproduces and outputs identification data DID. Accordingly, in the optical disk device 1, it is possible to detect the type of the mounted optical disk 2.

Comparison circuit 23 binarizes, by a predetermined threshold, the reproducing signal RF, which is output by the amplification circuit 21, to generate a binary signal, and then inputs this binary signal into the ODC 3. Thus, during the period while the laser beam scans the head area of each sector, the comparison circuit 23 generates a binary signal with a signal level varying according to a string of pits formed on the optical disk 2, and in the optical disk device 1, this binary signal is processed by a SM detection circuit 10 of the ODC 3 to be able to detect the sector mark.

The equalizer (EQ) 24 is formed by an equiripple filter and so on, and during the period while training data is reproduced with a read gate signal RG as a reference, the characteristics of the equalizer 24 are automatically adjusted. Using the adjusted characteristics, the equalizer 24 corrects the characteristics of the reproducing signal RF output by the amplification circuit 21 and outputs the reproducing signal RF. This correction of the characteristics by the equalizer 24 is made so that the response, which is made by the reproducing signal RF to the RLL data generated by the encoder/decoder 9, becomes a response corresponding to the partial response class 4 (PR(1, 2, 1)).

A PLL circuit 25 reproduces a clock CK from the reproducing signal RF output by the equalizer 24 and outputs it. An analog-digital conversion circuit (ADC: Analog to Digital Converter) 26 converts, from analog to digital, the reproducing signal RF output by the equalizer 24 with this clock CK as a reference, and outputs a digital reproducing signal DRF that is the result of the conversion.

A viterbi decoding circuit 27 viterbi-decodes this digital reproducing signal DRF, and further decodes RLL data D2R to output it. According to an instruction by the central process unit 4, the viterbi decoding circuit 27 also decodes NRZI data D1R that has been NRZI-modulated from RLL data D2R. Thus, if the optical disk 2 mounted to the optical disk device 1 has a format as described above with reference to FIG. 2, the viterbi decoding circuit 27 decodes the reproducing signal RF into NRZI data D1R to output it.

The central processing unit 4 is a controller that controls the whole operation of the optical disk device 1. If the mounting of the optical disk 2 is detected, the central processing unit 4 instructs a spindle motor, not shown, to drive the optical disk 2. The central processing unit 4 thus makes the optical disk 2 drive, controls a thread mechanism to make the optical pickup 20 seek the inner periphery side of the optical disk 2, and thereby acquires, from a decoding circuit 22, the result of processing the reproducing signal RF, wherein the result is obtained from the recording area of the identification data DID. Thus, the central processing unit 4 determines the type of the optical disk 2. Further, the central processing unit 4, according to the result of the determination, controls the operation of the read channel 6 and the thread mechanism so that data for file administration recorded on the inner periphery side of the optical disk 2 is reproduced, and thereby acquires the data for administration of the files of the optical disk 2.

After completion of a series of these steps, the central processing unit 4 waits for a command from the host device. When writing is instructed by the host device, the central processing unit 4 detects a free area on the optical disk 2 from the record of the data for file administration, in order to make the optical pickup 20 seek, according to the result of the detection. Further, according to the result of the detection, the central processing unit 4 instructs the ODC 3 sequentially of the sectors to write in, and instructs the whole operation to record user data that is sequentially input. On the other hand, if reproduction of a file is instructed by the host device, the central processing unit 4 detects the recording position from the data for file management, so as to instruct reproduction of the user data, according to the address information as the result of the detection.

In this reproduction process, the central processing unit 4 acquires the digital reproducing signal DRF in the training area from the analog-digital conversion circuit 26, and sets the characteristics of the equalizer 24, according to the signal level of this digital reproducing signal DRF. Accordingly, in the optical device 1, the characteristics of the equalizer 24 are automatically adjusted.

Figure 4:
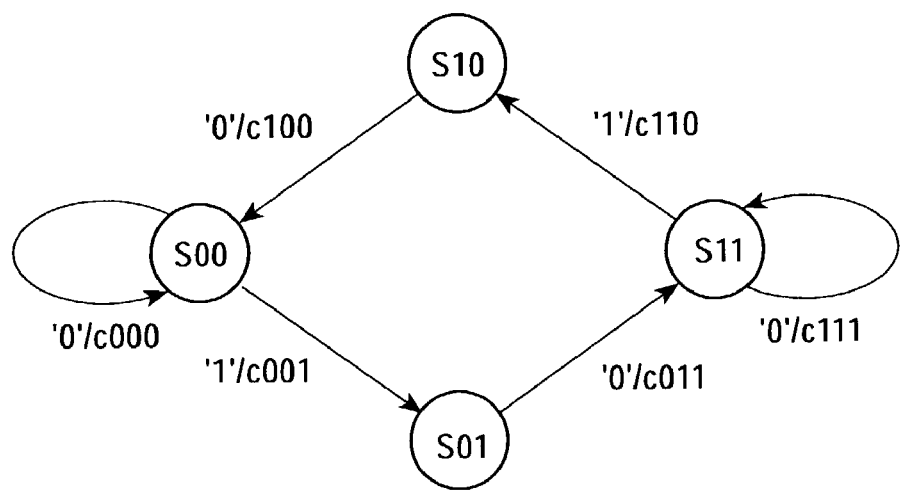
FIG. 4 is a schematic diagram showing status transition in a viterbi decoding circuit.

FIG. 4 is a schematic diagram showing the status transition in a viterbi decoding circuit 27. A PRML system applied to optical disk devices is generally composed of the partial response (1, 2, 1) and viterbi decoding with 4-value 4-status. In other words, defining $a_k$ as the value of RLL data that is the original data to be decoded and $b_k$ as the value of the recording data (corresponding to NRZI data) in recording by mark edge recording as in this embodiment, the relation between these can be represented by the following expression.

$$b_k = (a_k + b_k) \bmod 2 \qquad (1)$$

In this type of optical disk device 1, it is difficult to obtain ideal characteristics of the partial response (1, 2, 1) due to the following causes: impossibility of completely correcting, by an equalizer, the characteristics of a reproducing signal (digital reproducing signal) DRF obtained by reproducing data on an optical disk; asymmetry (the asymmetry of a reproducing waveform) due to the change of the light intensity of the laser beam in recording from an optimum value; and a phase error of a sampling block in analog-digital conversion, etc. Therefore, the characteristics are represented by the partial response ($\alpha$, $\beta$, $\gamma$).

The value $y_k$ of the digital reproducing signal DRF reproduced by this is represented by:

$$y_k = a_k + \beta \times b_{k-1} + \gamma \times b_{k-2} \qquad (2)$$

Since bk is 0 or 1 herein, the value $y_k$ can take 8 values of 0, $\alpha$, $\beta$, $\gamma$, $\alpha+\beta$, $\alpha+\gamma$, $\beta+\gamma$, and $\alpha+\beta+\gamma$. Further, in RLL (1, 7) modulation applied to this optical disk device 1, $a_k=1$ is not continuous. Therefore, the two patterns of (b, $b_{k-}$, $b_{k-2}$)=(1, 0, 1), (0, 1, 0) do not occur, thus the value $y_k$ can take 6 values of 0, $\alpha$, $\gamma$, $\alpha+\beta$, $\beta+\gamma$, and $\alpha+\beta+\gamma$.

On the other hand, with regard to the value $y_k$ of the digital reproducing signal DRF obtained by the ideal partial response (1, 2, 1), since $\alpha=\gamma=1$, and $\beta=2$, the value of $y_k$ can take 4 values of 0, 1, 3, and 4. Accordingly, the configuration of a viterbi decoder with the partial response (1, 2, 1) and 4-value 4-status actually corresponds to the configuration of a viterbi decoder with the partial response ($\alpha$, $\beta$, $\gamma$) and 6-value 4-status.

Further, since a noise is included in a reproducing signal in a practical data reproduction system, considering the effect of the noise and defining $n_k$ as the value of this noise, the value $z_k$ of a digital reproducing signal is represented by:

$$z_k = y_k + n_k = \alpha_k + \beta \times b_{k-1} + \gamma \times b_{k-2} \qquad (3)$$

Therefore, in the optical disk device 1, the viterbi decoder 27 combined with the partial response ($\alpha$, $\beta$, $\gamma$) shows status transition with 6-value 4-status, as shown in FIG. 4. In FIG. 4, cijk shows values that $y_k$ can take. Further, i, j, k are the values $b_{k-2}$, $b_{k-1}$, and $b_k$ respectively, thus c011 is the same as $b_{k-2}=0$, $b_{k-1}=1$, or $b_k=1$. Each status is represented by Sij. By this status transition diagram, it is understood that, with regard to the viterbi decoder 27, the status transition in which the original data $a_k$ is decoded consists of two cases, namely, transition from the status S00 to S01 and transition from the status S11 to S10.

Figure 5:
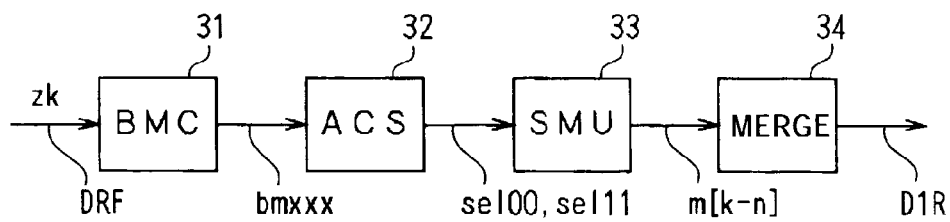
FIG. 5 is a block diagram of a viterbi decoding circuit in the optical disk device.

Based on this status transition, the viterbi decoder 27 is configured as shown in FIG. 5. The viterbi decoder 27 provides a BMC (Branch Metric Circuit) 31 with a digital reproducing signal DRF, and then the BMC 31 computes each branch metric bmxxx by arithmetic processing of the following expressions and outputs them. Each branch metric bmxxx is the absolute value of Euclid distance between the value z [k] of the digital reproducing signal DRF and each amplitude reference value (The reference values are 0, 1, 3, and 4, that is to say, the values which the value $y_k$ of the digital reproducing signal DRF obtained by the ideal partial response (1, 2, 1) can take.).

$$bm000 = (z[k] - C000)^2$$

$$bm001 = (z[k] - C001)^2$$

$$bm011 = (z[k] - C011)^2$$

$$bm111 = (z[k] - C111)^2$$

$$bm110 = (z[k] - C110)^2$$

$$bm100 = (z[k] - C100)^2 0 \qquad (4)$$

The following ACS (Add Compare Select) 32 adds the branch metrics bmxxx, which are output by BMC 31, to the corresponding path metrics by arithmetic processing of the following expressions, and thereby sequentially updates the path metrics. Each path metric is the sum of the past branch metrics, where ACS 32 selects the most likelihood path by this process. Herein, mij [k] is the path metric of the status Sij at the time t=k.

| | |
|---|---|
| m10 [k] = m11 [k-1] + bm110 | (5-1) |
| m11 [k] = min (m11 [k-1] + bm111, m01 [k-1] + bm011) | (5-2) |
| m01 [k] = m00 [k-1] + bm001 | (5-3) |
| m00 [k] = min (m00 [k-1] + bm000, m10 [k-1] + bm100) | (5-4) |

The ACS (Add Compare Select) 32 outputs sel00 and sel11, which are the selection results of the arithmetic of min in expressions (5-2) and (5-4). These selection results, sel00 and sel11, are represented by:

sel00=0

(if $m00[k-1]+bm000 < m01[k-1]+bm\mathbf{011}$)

sel00=1

(if $m00[k-1]+bm000 > m01[k-1]+bm\mathbf{011}$)

sel11=0

(if $m11[k-1]+bm111 < m01[k-1]+bm\mathbf{011}$)

sel11=1

(if $m11[k-1]+bm111 > m01[k-1]+bm011$) (6)

Figure 6:
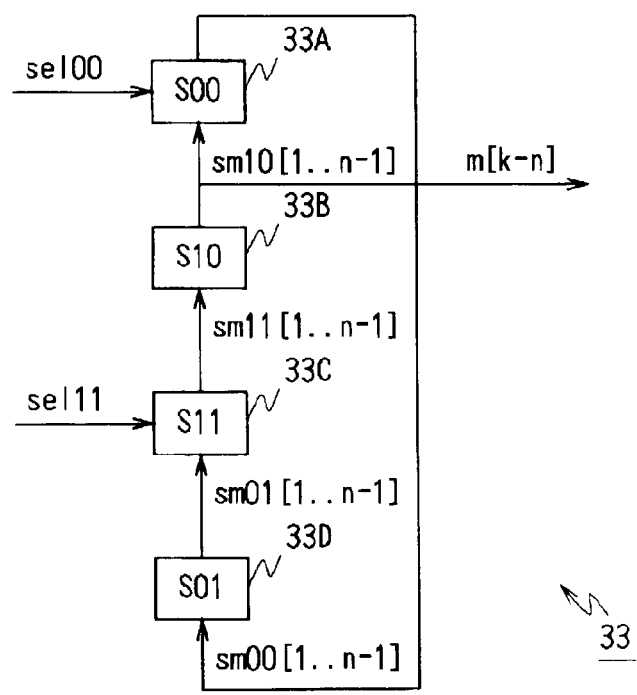
FIG. 6 is a block diagram of SMU in the viterbi decoding circuit in FIG. 5.
Figure 7:
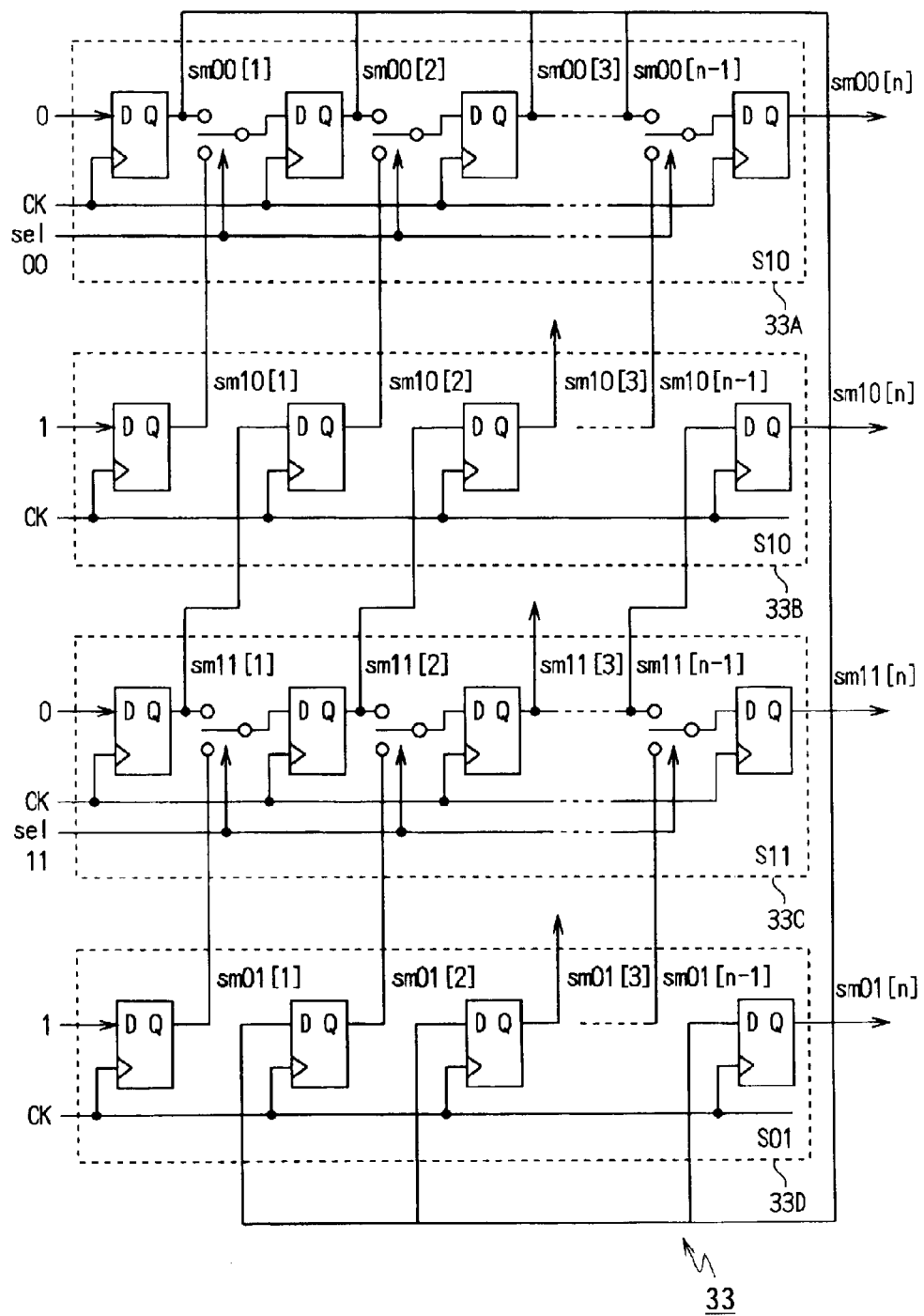
FIG. 7 is a block diagram showing the SMU in FIG. 6 in detail.

A SMU (Status Memory Unit) 33 transfers the contents of shift resistors corresponding to each status, selectively according to these selection results of sel00 and sel11, and thereby detects transitions between each status. As shown in FIG. 6, the SMU (Status Memory Unit) 33 is formed by four subblocks, 33A to 33D, corresponding to the respective status S00 to S11. As shown in FIG. 7, each of the subblocks 33A to 33D is composed of resistors in plural stages. In the subblocks 33A and 33C corresponding to the status S00 and S11 respectively, logical values of value 0 and value 1 are input into the respective first stages, and in the following resistors, output values of the resistors just before respective resistors, or the output values of the corresponding resistors of the subblocks 33B and 33D with the respective status S10 and S00 are input, selectively according to the selection results of sel00 and sel11. On the other hand, in the subblocks 33B and 33D in the respective status S10 and S01, the logical values of value 0 and value 1 are input into the respective first stages. In the following resistors, output values of the corresponding resistors in the subblocks 33A and 33C in the respective status S00 and S11 are input.

Thus, SMU33 detects the transition of each status, corresponding to the status transition described with reference to FIG. 4. If the number of stages (i.e. a path length) of the shift resistors composing respective subblocks, 33A to 33D, is large enough, then the output values, that is to say, output from the last stages of the respective subblocks 33A to 33D are merged into a same value. This path length is set to a suitable length, according to C/N ratio of a digital reproducing signal DRF, frequency characteristics, etc.

A merge block 34 inputs the output of the last stage of one of the subblocks 33A to 33D, and thereby outputs a decode result. Defining m [k−n] ('n' is the number of stages of the resistors in the subblocks 33A to 33D.) as the signal that is input to the merge block 34, decoded data is uniquely determined, corresponding to the transition from sm [k−n−1] to sm [k−n].

Figures 8, 9:
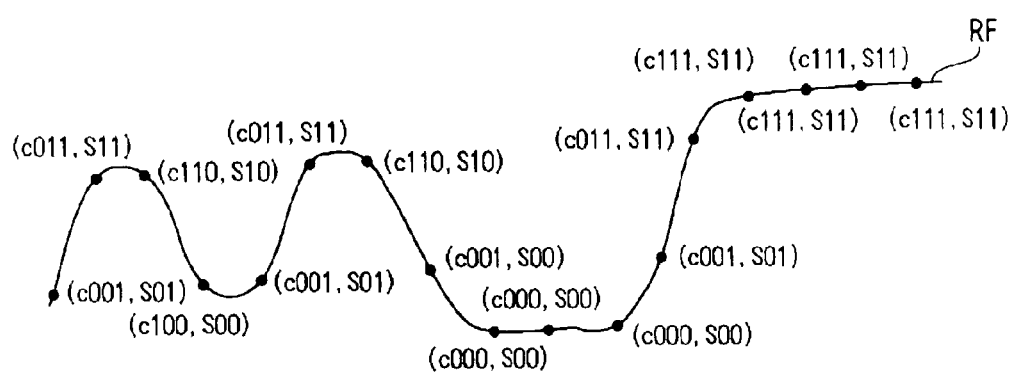
FIG. 8 is a diagram for explaining the operation of the viterbi decoding circuit in FIG. 5.
FIG. 9 is a signal waveform diagram showing the relationship between a reproducing signal and the operation of the viterbi decoding circuit.

FIG. 8 is a diagram showing the decoding results corresponding to the status transition diagram in FIG. 4. In the case of transition from the status S00 to S01, and in the case of transition from S11 to S10, the decoding result of a logic 1 is obtained. In a typical viterbi decoding circuit, thus, RLL data D2R, which is pulse-position-modulated data, is decoded by the output data of the SMU33 and output.

The comparison of the status of the RLL data D2R with the reproducing signal RF is represented as shown in FIG. 9. By FIG. 9, it is understood that, in pulse-position-modulated data, with regard to the transition from the status S00 to S00 and the transition from the status S11 to S10, wherein the logical value becomes value '1' in both transitions, the transition from the status S00 to S01 is at a change point from a space to a mark, while transition from the status S11 to S10 is at a change point from a mark to a space.

Accordingly, the merge block 34 changes the table corresponding to FIG. 9, according to an instruction by the central processing unit 4. Thus, if the optical disk 2 is an optical disk with a format described above with reference to FIG. 2, then NRZI data D1R is output as the result of decoding. If the optical disk is not an optical disk with a format described above with reference to FIGS. 2A and 2B, then RLL data D2R is output as the result of decoding.

By FIG. 8, it is understood that the result of decoding NRZI data D1R and the result of decoding as RLL data D2R are output by the same expression of condition and different only in values (in this case, values of m [k−n−1] and m [k−n]), and thus it is possible to change operation with a simple configuration.

As described above, in the optical disk device 1, the viterbi decoding circuit 27 is configured as decoding means for decoding, by signal processing of a reproducing signal, NRZI data D1R that raises a logical value with a timing corresponding to edges of pits or edges of marks, and pattern detecting means for detecting a certain pattern from the NRZI data D1R.

Now, the operation in this embodiment will be described.

In the configuration described above, if the optical disk device 1 (FIG. 1) is mounted with the optical disk 2, the optical pickup 20 is controlled by the central processing unit 4 to seek the inner periphery side of the optical disk 2, and thus disk identification data DID recorded in the area on this inner periphery side is reproduced. In the optical disk device 1, the type of the optical disk 2 is detected by this disk identification data DID.

By this detection of the type of the optical disk 2, when the optical disk 2 mounted to the optical disk device 1 is determined to be an optical disk with a conventional format, in the optical disk device 1, according to an instruction by the host device for writing, user data sequentially input from the host device is divided into block units of a predetermined size, and has error correction symbols to be interleaved added thereto. Further, after the data is added with a synchronizing pattern and the like, RLL data is generated by RLL-modulation, then this RLL data is NRZI-modulated to be converted into a string of data of NRZI data D1W for recording, thereafter, the optical pickup 20 is driven, according to the string of data, by the laser driver 5 to form a string of marks on the optical disk 2, and thereby the user data is recorded.

Similarly, upon instruction by the host device for reading, a reproducing signal RF obtained from the optical pickup 20 is corrected by the equalizer 24, thereafter a clock CK is reproduced by the PLL circuit 25, and further, the analog-digital conversion circuit operates, with the clock CK as a reference, to generate a digital reproducing signal DRF. In the optical disk device 1, the digital reproducing signal DRF is viterbi-decoded by the viterbi decoding circuit 27 into RLL data D2R. In the optical disk device 1, the formatter 15 provided to the encoder/decoder 9 detects a synchronizing pattern from the RLL data D2R. Further, by setting a window with this synchronizing pattern as a reference, the RLL data D2R is selectively processed for RLL decoding, thereafter the user data is reproduced by interleaving and error correction processing to be output to the host device.

On the other hand, if the optical disk 2 mounted to the optical disk device 1 is an optical disk with a format capable of moving the recording position with a variable gap length between headers provided in a preformat (FIG. 2); in the optical disk device 1, upon instruction by the host device for writing, same as conventionally, user data is processed and added with error correction symbols, thereafter interleaving is performed, and then VFO3 in the format of the optical disk 2, training data, synchronizing pattern Sync, and the like, are added. Further, RLL data is generated by RLL-modulation, then the RLL data is NRZI-modulated to generate NRZI data D1W, and the optical pickup 20 is driven by a laser driver 5, according to this NRZI data D1W, to form a string of marks on the optical disk 2, thereby recording the user data.

In the optical device 1, a reproducing signal RF, which is the result of receiving a returning light created by irradiating the optical disk 2 with a laser beam, is amplified by the amplification circuit 21 and binarized by the comparison circuit 23. Then, sector-mark detection circuit 10 monitors change in the signal level of the binarized signal to detect the head of each sector. Further, a preformatted address is detected by the result of the detection, and thus the corresponding address is detected. Then, with the output of the write gate signal WG, which is generated by the gate signal generation circuit 11 and uses the timing of the detection of the sector mark as a reference, NRZI data D1W is output to the laser driver 5 to be recorded onto the optical disk 2. In the optical disk device 1, the write gate signal WG is generated by the gate signal generation circuit 11 such that the timing of the write gate signal WG, with the timing of the detection of a sector mark as a reference, randomly varies within a predetermined range. Thus sectors are formed with the length of gap variously changing. Accordingly, in the optical disk device 1, repeated data recording to the same place is prevented, and thereby characteristics degradation of the optical disk 2 by repeated recording is effectively avoided.

However, if the length of gap variously changes as described above, then the distance between a sector mark and a synchronizing pattern Sync also variously changes, which makes it hard to set a window for detection of a synchronizing pattern Sync. In other word, generally, a narrow window improves the detection accuracy of a synchronizing pattern, but, on the other hand, cannot respond to the change in the distance from a sector mark to a synchronizing pattern Sync, and thus detection of the synchronizing pattern Sync may fail. Conversely, a wide window can respond to the change of the distance from a sector mark to a synchronizing pattern Sync, but causes accuracy degradation of detecting a synchronizing pattern.

This means that, in this embodiment, the requirement described before to improve the detection accuracy of a certain pattern such as a synchronizing pattern without increasing the redundancy of the format is not satisfied, and a configuration that makes it even more difficult to solve the problem is employed.

Therefore, in the optical disk device 1, training data provided for automatic adjustment of the characteristics of the equalizer 24 is used to detect a synchronizing pattern Sync. In other words, in the optical disk device 1, with regard to various data to be added to user data and recorded, training data is allocated just before a synchronizing pattern Sync. In the optical disk device 1, the area to record the training data is divided into 8 areas. Patterns, 1 to 4, are sequentially and repeatedly recorded in the respective areas. Further, these patterns, 1 to 4, are set such that marks and spaces with the periods of 2T, 3T, and 5T, which are suitable for adjustment of the equalizer 24, are sequentially repeated.

In the optical disk device 1, upon instruction by the host device to reproduce data, a reproducing signal RF obtained from the optical disk 2 is amplified by the amplification circuit 21, and thereafter characteristics are adjusted by the equalizer 24. Further, an output signal of the equalizer 24 is processed by the analog-digital conversion circuit 26 to generate a digital reproducing signal DRF, and then the digital reproducing signal DRF is monitored by the central processing unit 4, thereby the characteristics of the equalizer 24 are set and thus automatically adjusted. In this embodiment, the characteristics of the equalizer 24 are adjusted by this automatic adjustment to become close to the characteristics of the partial response (1, 2, 1).

Thus, in the optical disk device 1, according to the detection result by the sector-mark detection circuit 10, the digital reproducing signal DRF is processed by the viterbi decoding circuit 27, and accordingly the data recorded in the optical disk 2 is decoded by PRML. Further, in the optical disk device 1, this data decoded by the viterbi decoding circuit 27 is input to the encoder/decoder 9. The training data is recorded by the formatter 15, thereby the boundaries between each of the areas of T1 to T8 are detected, and with the result of the detection as a reference, a window is set to detect a synchronizing pattern Sync. Still further, with this synchronizing pattern Sync as a reference, the result of decoding of the data field is sequentially and selectively processed, and thereby user data is reproduced. In the optical disk device 1, by such detecting a synchronizing pattern Sync with training data as a reference, a synchronizing pattern is securely detected even when recording with a valuable length of gap.

In processing in such a manner, in the optical disk device 1, since the above described training data is a repeat of marks and spaces with the periods of 2T, 3T, and 5T, which are suitable for adjustment of the equalizer 24, detection of training data by conventional RLL data may detect the boundaries between the areas of T1 to T8 with errors. To avoid this, special patterns suitable for detecting patterns may be added to the training data, but this would cause a great increase in redundancy. Replacing the training data with such special patterns would also cause a problem in adjusting the equalizer 24.

Therefore, in the optical disk device 1, if the optical disk 2 mounted to the optical disk device 1 has records of such training data, the output of the viterbi decoding circuit 27 is changed by the central processing unit 4 from RLL data D2R to NRZI data D1R that has been NRZI-modulated from this RLL data D2R.

In this NRZI data D1R (FIG. 8), a logical value is changed by a logic 1 in RLL data D2R, and a logic 0 in RLL data D2R is set as a logic 1 or a logic 0, corresponding to a mark and a space. In other words, in NRZI data D1R, a logic 1 in RLL data D2R is represented by the change of the logical value, and whether a logic 0 in RLL data D2R is by a mark or by a space is indicated by a logical value. Thus, NRZI data D1R includes more information than RLL data D2R to make it possible to obtain the results of comparison determination with higher accuracy, compared to the case of comparison determination of training data and the like with RLL data D2R as a reference.

Thus, in the optical disk device 1, the result of decoding as NRZI data D1R is input to the formatter 15, then, according to the result of determination of the coincidence of sequential 40 channel bits and a predetermined determination reference, the boundary set in the training area is detected. This boundary detects a synchronizing pattern Sync. Accordingly, in the optical disk device 1, the detection accuracy of a certain pattern can be improved by the training data used as a synchronizing pattern, without increasing the redundancy of the format due to an increase in training data.

Further, through generating NRZI data D1R by the viterbi decoding circuit 27, error correction capability in the viterbi decoding circuit is effectively used to avoid the effects by a noise and the like.

Still further, since a synchronizing pattern Sync is detected by the formatter 15, comparing the decoding result of NRZI data D1R and the predetermined determination reference, the detection accuracy can be improved without increasing the redundancy.

With the above described configuration, detecting a certain pattern with use of NRZI data, which is NRZI-modulated from pulse-position-modulated data and is obtained by processing a reproducing signal, improves the accuracy of detecting a certain pattern such as a synchronizing pattern or the like without increasing the redundancy of a format.

By performing this process of reproducing signal with a viterbi decoding circuit, error correction capability in the viterbi decoding circuit is effectively used to avoid the effects by a noise etc., which also improves the accuracy of detecting a certain pattern.

With the result of this pattern detection as a reference, NRZI data is selectively processed in order to decode user data, thereby enabling secure reproduction of data recorded in a high density.

Further, according to instruction by a control means, that is to say, the central processing unit, pulse-position-modulated data is output instead of NRZI data, then a certain pattern is detected from this pulse-position-modulated data, and thereby the compatibility with conventional disks is maintained.

Although in the above described embodiment, selective decoding of pulse-position-modulated data and NRZI data by a vierbi decoding circuit has been mentioned, the present invention is not limited to this. It is also possible to decode pulse-position-modulated data, and, depending on the necessity, to NRZI-modulate this decoded pulse-position-modulated data in order to output NRZI data.

Further, although in the above described embodiment, decoding of NRZI data by a vertibi decoding circuit has been described, the invention is not limited to this, making it possible to widely use various maximum likelihood decoding circuits.

Still further, although in the above described embodiment, training data is detected, from the result of which a synchronizing pattern Sync is detected to process user data, the invention is not limited to this. For example, in the case that the length of gap is not changed, or the change amount is small, synchronizing patterns can be directly detected, and thus the invention is widely applicable.

Yet further, although in the above described embodiment, NRZI data is, according to the result of detection of a certain pattern, selectively processed to reproduce user data, the invention is not limited to this, widely enabling various use of the detection result of such a certain pattern. Specifically, it is possible to use the detection result for identification of marks and spaces, in order to detect and analyze the tendency of error occurrence in marks, spaces, and the boundaries therebetween, and optimize the pulse waveform, the light intensity of a laser beam, etc., when writing, according to the analysis results. Similarly, it is also possible to set the gain of the amplification circuit 21, the frequency characteristics of various filters, the path length in the viterbi decoding circuit, and so on.

Still yet further, although in the above described embodiment, an application of the invention to a phase-change-type optical disk device has been mentioned, the present invention is not limited to this, and can be widely applied to an optical disk device as an optical disk device, and others.

What is claimed is:

1. A disk shape recordable medium reproducing device comprising:

data output means for selectively outputting pulse-position-modulated data generated using a timing corresponding to edges of pits or edges of marks, or NRZI-modulated data from said pulse-position-modulated data;

pattern detecting means for detecting a predetermined pattern from data outputted from said data output means;

user data decoding means for decoding user data recorded on said disk shape recordable medium, and for selectively processing said data outputted from said data output means based on detecting results of said pattern detecting means; and disk type detecting means for detecting a type of said disk shape recordable medium, wherein said data output means selectively output said pulse-position-modulated data or said NRZI-modulated data based on the results of said detected disk type.

2. The disk shape recordable medium reproducing device according to claim 1, further comprising:

equalizer means for generating equalizer compensating characteristics of the reproduced signal, and for outputting said equalizer compensating characteristics to said data output means, according to training data included in said reproduced signal, wherein said data output means, in case of selectively outputting said NRZI-modulated data, detect said training data and said predetermined pattern based on a timing of detecting said training data.

3. The disk shape recordable medium reproducing device according to claim 1, further comprising:

equalizer means for generating equalizer compensating characteristics of the reproduced signal, and for outputting said equalizer compensating characteristics to said data output means, according to training data included in said reproduced signal, wherein said predetermined pattern is a pattern of said training data.

* * * * *